United States Patent
Sethuram et al.

(10) Patent No.: US 7,643,487 B2
(45) Date of Patent: Jan. 5, 2010

(54) SYSTEM AND METHOD FOR DELIVERING THE MAGIC PACKET TO WAKE UP A NODE IN REMOTE SUBNET

(75) Inventors: Saiprasad Sethuram, Karnataka (IN); Jaya Sangeetha Chinnaswamy, Tamil Nadu (IN); Ashok Padhy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 538 days.

(21) Appl. No.: 11/313,905

(22) Filed: Dec. 20, 2005

(65) Prior Publication Data
US 2007/0070998 A1 Mar. 29, 2007

(30) Foreign Application Priority Data
Sep. 28, 2005 (IN) ......................... 2606/DEL/2005

(51) Int. Cl.
*H04L 12/28* (2006.01)
*H04L 12/56* (2006.01)
(52) U.S. Cl. ...................................... 370/392; 713/310
(58) Field of Classification Search ........................ None
See application file for complete search history.

(56) References Cited
U.S. PATENT DOCUMENTS

| | | | | |
|---|---|---|---|---|
| 6,049,885 A | 4/2000 | Gibson et al. | ............... | 713/324 |
| 6,381,650 B1 | 4/2002 | Peacock | ..................... | 709/245 |
| 6,418,124 B2 | 7/2002 | Brabenac | ..................... | 370/257 |
| 7,324,518 B2* | 1/2008 | Dai et al. | ..................... | 370/392 |
| 2005/0091331 A1 | 4/2005 | Brown et al. | ................. | 709/208 |
| 2005/0180326 A1 | 8/2005 | Goldflam et al. | ............ | 370/231 |
| 2005/0198219 A1* | 9/2005 | Banerjee et al. | ............. | 709/220 |
| 2006/0034318 A1* | 2/2006 | Fernandes et al. | ........... | 370/463 |
| 2006/0056397 A1 | 3/2006 | Aizu et al. | .................. | 370/352 |

OTHER PUBLICATIONS

AMD; "Magic Packet Technology"; Advanced Micro Devices, Inc.; Publication No. 20213, Rev: A; pp. 6, 1998.

* cited by examiner

*Primary Examiner*—Gregory B Sefcheck
*Assistant Examiner*—Suk Jin Kang
(74) *Attorney, Agent, or Firm*—Baker Botts L.L.P.

(57) ABSTRACT

A system and method for delivering the magic packet to wake up a node in a remote subnet are disclosed. A method includes receiving a message generated by a source node located on a first subnet at a switching device located on a second subnet, where the message includes an address associated with a target node. The switching device determines if the target node is located on the second subnet by comparing the address to a plurality of network addresses included in a memory of the switching device. The message is communicated to the target node if the address matches one of the network addresses in the memory and is used to wake up the target node.

22 Claims, 2 Drawing Sheets

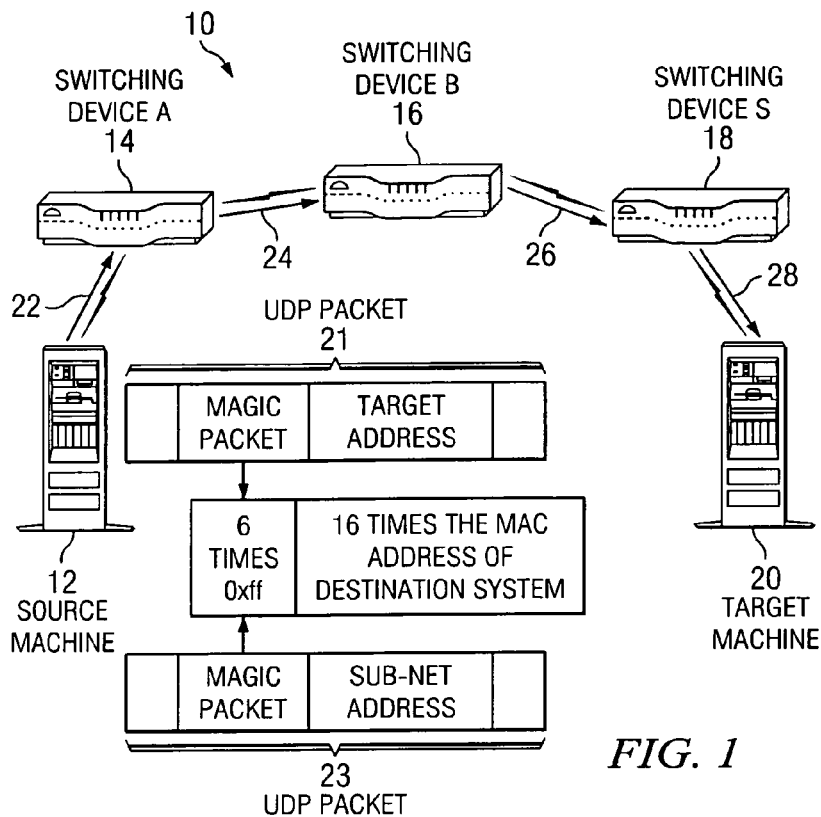
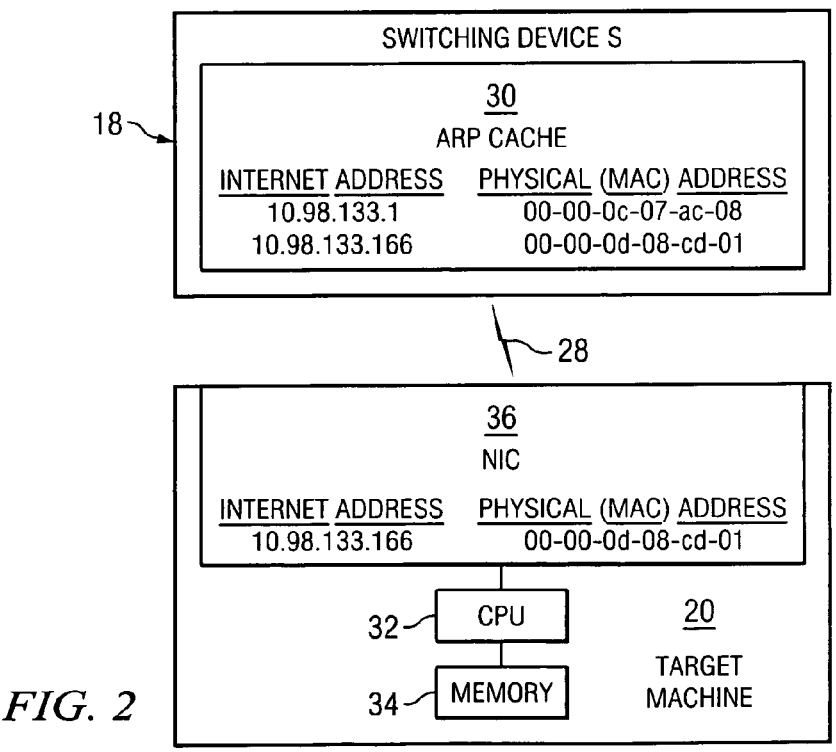
FIG. 1
FIG. 2

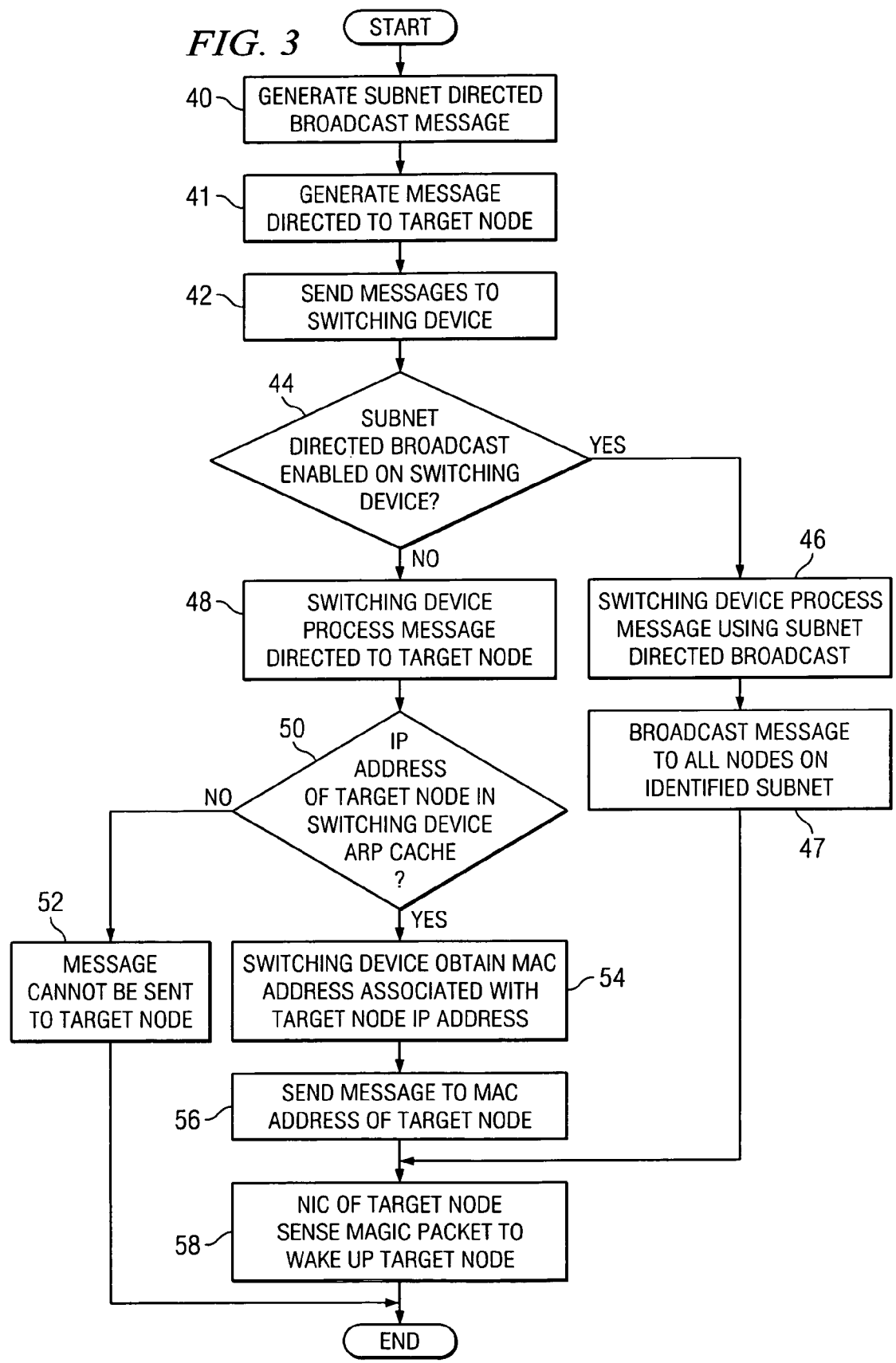

SYSTEM AND METHOD FOR DELIVERING THE MAGIC PACKET TO WAKE UP A NODE IN REMOTE SUBNET

FOREIGN PRIORITY

This application claims foreign priority to Indian Patent Application Number 2606/DEL/2005 filed Sep. 28, 2005.

TECHNICAL FIELD

The present disclosure relates in general to network communication, and more particularly to a system and method for delivering the magic packet to wake up a node in a remote subnet.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today, networks are typically used to connect personal computers and workstations with file servers, print servers, modems, hubs, and other devices. Examples of such networks include Local Area Networks (LANs), metropolitan area networks (MANs), and wide area networks (WANs). These networks enable the personal computers and workstations to share information and resources. For security and performance reasons, networks may be divided into subnets that are coupled together by multiple switching devices.

Often, these networks may use a network manager to manage operations of the devices on the network, to analyze resource performance, to identify and resolve faults, and to automate management tasks. In a specific example, the network manager may be used to wake up a node that is in a sleep mode. The remote power on may be accomplished by using magic packet technology, which involves the sending of a specially formatted packet of information to a target node. A detecting apparatus of the target node may scan all incoming transmissions from a network device, and wake up the target node upon detection of the magic packet.

One technique for sending the magic packet to the target. node uses a subnet-directed broadcast, which broadcasts a message to all nodes on the identified subnet. The intended target node recognizes the message by identifying the magic packet, reading the hardware address encapsulated in the magic packet and using the magic packet to perform a sequence of instructions to wake the node from a sleep mode if the encapsulated hardware address matches the hardware address for the target node. However, the subnet-directed broadcast feature of all switching devices used to deliver the magic packet must be enabled to provide subnet-directed broadcasts in order for the packet to be properly delivered to the target node.

Today, the subnet-directed broadcast feature in many switching devices is not enabled in order to prevent the broadcast addresses from being used for "smurf" or similar attacks. Therefore, the switching devices have to be manually configured to allow subnet-directed broadcasts. This solution may not be practically feasible because of the risks involved in configuring a large number of switching devices on a network.

SUMMARY

In accordance with the present disclosure, the disadvantages and problems associated with routing messages to nodes on different subnets of a network have been substantially reduced or eliminated. In a particular embodiment, a switching device receives a message including an address associated with a node and communicates the message to the node if the address matches one of a plurality of network addresses included in a memory.

In accordance with one embodiment of the present disclosure, a method for delivering a magic packet to wake up a node in a remote subnet includes receiving a message generated by a source node located on a first subnet at a switching device located on a second subnet, where the message includes an address associated with a target node. The switching device determines if the target node is located on the second subnet by comparing the address to a plurality of network addresses included in a memory of the switching device. The message is communicated to the target node if the address matches one of the network addresses in the memory and is used to wake up the target node.

In accordance with another embodiment of the present disclosure, a method for delivering a magic packet to wake up a node in a remote subnet includes receiving a user datagram protocol (UDP) packet generated by a source node located on a first subnet at a switching device located on a second subnet, where the message includes a magic packet and an internet protocol (IP) address associated with a target node. The switching device determines if the target node is located on the second subnet by comparing the address to a plurality of network addresses included in an address resolution protocol (ARP) cache of the switching device. The UDP packet is communicated to the target node if the address matches one of the network addresses in the ARP cache and is used to wake up the target node.

In accordance with a further embodiment of the present disclosure, a system for delivering a magic packet to wake up a node in a remote subnet includes a target node located on a first subnet and a source node located on a second subnet. The source node generates a message including an address associated with the target node. A switching device is coupled to the target node that receives the message and compares the address with a plurality of network addresses stored in a memory to determine if the target node is located on the first subnet. The switching devices further communicates the message to the target node if the address matches one of the network addresses in the memory and is used to wake up the target node.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates a pictorial diagram of an example communications network in accordance with teachings of the present disclosure;

FIG. 2 illustrates a block diagram of a switching device and a target node included in a subnet of a communication network in accordance with teachings of the present disclosure; and FIG. 3 illustrates a flow chart of a method for waking up a node in a remote subnet in accordance with teachings of the present disclosure.

DETAILED DESCRIPTION

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, a server, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates a diagram of communication network 10 for delivering a message to wake up target node 20 located on a remote subnet of network 10. Although a specific communication network is illustrated in FIG. 1, the term "communication network" should be interpreted as generically defining any network capable of transmitting telecommunication signals, data and/or messages. In the illustrated embodiment, network 10 includes source node 12, switching devices 14, 16 and 18 (generally referred to as switching devices 14) and target node 20. In one embodiment, source node 12 may generate User Datagram Protocol (UDP) packets 21 and 23 that include a magic packet used to remotely wake up target node 20. UDP packet 23 may include a subnet-directed broadcast address that is valid if the subnet-directed broadcast feature of switching devices 14 is enabled. UDP packet 21 may include a network address that identifies target node 20 such that switching device 18 may compare the network address to a list of addresses associated with nodes located on the subnet, which may be stored in an address resolution protocol (ARP) cache. In this manner, the magic packet may be delivered to target node 20 even if switching devices 14 are not configured for subnet-directed broadcasts.

Network 10 may be a local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as media). In a particular embodiment, network 10 may be an Internet Protocol (IP) network. Although subsequent description will primarily focus on IP communications, it should be understood that other appropriate methods of transmitting media over a network, such as a Frame Relay, Asynchronous Transfer Mode (ATM), or other packet-based network, are also included within the scope of the present disclosure.

IP networks and other packet-based networks typically transmit media by placing the data in cells, packets, frames, or other portions of information (generally referred to as packets) and sending each packet individually to the selected destination. Unlike a circuit-switched network, such as the PSTN, dedicated bandwidth is not required for communication of a packet over network 10. Instead, nodes 12 and 20 may send packets across network 10 as network 10 becomes available for transmission. This feature makes bandwidth available for additional communications when nodes 12 and 20 are not communicating media.

As shown in FIG. 1, network 10 may include source node 12 and target node 20. Source node 12 and target node 20 may include one or more information handling systems, as defined herein. Additionally, source node 12 and target node 20 may be any type of processing device and may provide any type of functionality associated with an information handling system, such as database management, transaction processing, or web server functionality.

Network 10 may additionally include switching devices 14. In the illustrated embodiment, source node 12 may be communicatively coupled to switching device 14 and target node 20 may be communicatively coupled to switching device 18. Switching devices 14 may be switches, routers, or any other devices having intelligent communications switching functionality, and may include any suitable number of ports for communicating with source node 12, target node 20 and/or various other devices (not expressly shown) coupled to network 10.

The identity of a device on a network (e.g., source node 12 and target node 20 in network 10) may typically be associated with a unique IP address as well as a hardware address, such as a medium access control (MAC) address. The IP address may be used to identify a device at the network layer of network 10 and the MAC address may be the hardware address that is used by the data link layer of network 10. The IP address may often be used at the process layer by various application programs and the MAC address may not be directly accessible by these application programs.

In the illustrated embodiment, switching devices 14 may be associated with different subnets of network 10 and each subnet may be identified by a different IP address. For example, an IP address may have thirty-two bits and may be depicted as a dot address containing four groups of decimal numbers, each representing a string of eight binary digits, separated by periods. In one embodiment, the first two groups may represent the address that identifies the network, the third group may represent the address that identifies the subnet and the fourth group may represent the address that identifies the node. In the illustrated embodiment, source node 12 may be assigned an IP address of 10.98.112.122 and target node may be assigned an IP address of 10.98.133.166, where 10.98 is the network address, 112 is the subnet address for the subnet associated with switching device 14 and 133 is the subnet address for the subnet associated with switching device 18, and 122 is the address for source node 12 and 166 is the address for target node 20. Therefore, any node coupled to switching device 14 may have a subnet address of 10.98.112 and any node coupled to switching device 18 may have a subnet address of 10.98.133.

In operation, source node 12 may be used to generate a message used to wake up a sleeping node (e.g., target node 20) located on a different subnet. In one embodiment, the message may be generated as a UDP packet (e.g., UDP packets 21 and 23) that includes a magic packet and a destination address. The magic packet generally includes a synchronization stream and a hardware address stream for the destination node. The synchronization stream may be defined in magic packet technology as a predetermined number of sync duplications of a sync byte, e.g. up to six bytes of FFh, whereas the hardware address stream may be defined as a predetermined number of address repetitions, e.g. up to sixteen address repetitions, of a hardware address assigned to the selected sleeping node, thereby improving the chances of detecting the magic packet. In one embodiment, the hardware address stream may be the MAC address of the sleeping node (e.g., target node 20). UDP packet 23 may also include a destination address to identify the remote subnet. In one embodiment, the destination address for a subnet directed broadcast may be an IP address such as 10.98.133.255, where 10.98.133 is the subnet address. UDP packet 21 may also include a destination address to identify the sleeping node. In one embodiment, the destination address may be an IP address associated with target node 20.

Once source node 12 generates the message to wake up target node 20, source node 12 may communicate UDP packet 23 to switching device 14 via communication path 22. In one embodiment, switching devices 14 may be configured to allow a subnet-directed broadcast such that UDP packet 23 is broadcast to all nodes on the identified subnet. Switching device 14 may identify the appropriate subnet of network 10 by reading the destination address included in UDP packet 23.

In the illustrated embodiment, switching device 14 may use the destination address to communicate UDP packet 23 via communication path 24 to switching device 16 and switching device 16 may forward UDP packet 23 to switching device 18 via communication path 26. Once switching device 18 has received UDP packet 23, switching device 18 may communicate UDP packet 23 to all nodes on the subnet. Target node 20 may receive UDP packet 23 from switching device 18 via communication path 28 and recognize that UDP packet 23 includes a magic packet for target node 20 based on the repeated hardware address. The magic packet may cause target node 20 to execute a routine that causes target node 20 to exit from the sleep mode such that target node 20 may be monitored by source node 12 and may respond to requests for information from other nodes.

In another embodiment, switching devices 14 may not be configured to allow a subnet-directed broadcast such that switching device 14 cannot forward UDP packet 23 to switching device 18 based on the destination address contained in UDP packet 23. In this case, UDP packet 21 that includes a magic packet and the destination address for target node 20 may be communicated to switching device 14 via communication path 22. Switching device 14 may read UDP packet 21 to obtain the destination address (e.g., the network, subnet and node portions of the IP address for target node 20) to forward UDP packet 21 to target node 20 via switching devices 16 and 18. UDP packet 21 may be communicated from switching device 14 to switching device 16 via communication path 24 and from switching device 16 to switching device 18 via communication path 26. Switching device 18 may read the destination address included in UDP packet 21 for target node 20 and compare the destination address to a list of IP addresses for each node in the subnet (e.g., each node coupled to switching device 18) stored in a memory of switching device 18. The memory may additionally include the hardware addresses for each of the nodes in the subnet, where each hardware address is mapped to a corresponding IP address. If the destination address read from UDP packet 21 is included in the memory, switching device 18 obtains the hardware address mapped to the destination address and communicates UDP packet 21 to target node 20 via communication path 28 based on the hardware address obtained from the memory.

Target node 20 may recognize that UDP packet 21 includes a magic packet and may use the magic packet to exit the sleep mode. As such, switching devices 14 may deliver UDP packet 21 to the appropriate subnet even if not enabled for subnet-directed broadcasts by comparing the destination address associated with target node with the addresses stored in memory. Delivery of UDP packet 21, therefore, may be accomplished without the need to manually configure switching devices 14.

FIG. 2 illustrates a block diagram of switching device 18 for determining how to route UDP packet 21 to target node 20. In the illustrated embodiment, target node 20 includes CPU 32, memory 34 and network interface card (NIC) 36. NIC 36 may be interfaced with communication path 28 to receive packets communicated from switching device 18. In operation, switching device 18 may determine that UDP packet 21 should be communicated to target node 20 by comparing the destination address in UDP packet 21 with a list of addresses stored in a memory associated with switching device 18. The memory may map the IP address associated with each of the nodes contained on the subnet with the corresponding hardware address for each of the nodes. If the destination address is located in the memory, switching device 18 may use the corresponding hardware address to communicate UDP packet 21 to target node 20. NIC 36 may receive UDP packet 21, determine that UDP packet 21 contains a magic packet and execute a routine to wake up target node 20.

CPU 32 may be a microprocessor, a microcontroller, a digital signal processor (DSP) or any other digital or analog circuitry configured to execute processing instructions stored in memory 34. Memory 34 may be random access memory (RAM), electrically erasable programmable read-only memory (EEPROM), a PCMCIA card, flash memory, or any suitable selection and/or array of volatile or non-volatile memory. NIC 36 may be a circuit board or card, an integrated chip built into the motherboard of target node 20 or any other suitable analog or digital circuitry that provides a connection to network 10.

Switching device 18 may include a memory to store the addresses that identifies the nodes included on a subnet of network 10. In the illustrated embodiment, the memory may be address resolution protocol (ARP) cache 30 that maps the IP address associated with a node to a corresponding MAC address. Although a specific number of entries are illustrated, ARP cache 30 may include any number of addresses such that the number of entries may be equal to the number of nodes associated with a subnet of a network.

In operation, switching device 18 may receive a message (e.g., UDP packet 21) from another switching device (e.g., switching device 16) located on another subnet of network 10. Switching device 18 may read the destination address included in the message and compare the destination address with the IP addresses included in ARP cache 30. If the destination address does not match any of the addresses contained in ARP cache 30, the node for which the message was intended is not located on the subnet associated with switching device 18 or the node has not been identified as being connected to the subnet. If the destination address does match one of the addresses contained in ARP cache 30, the intended node is located on the subnet associated with switching device 18. In this case, switching device 18 may obtain the MAC address mapped to the IP address that matches the destination address in the received message and uses the MAC address to send the message to the appropriate node.

In one embodiment, UDP packet 21 may include a destination address of 10.98.133.166 (e.g., the IP address associated with target node 20). Switching device 18 may use this address to search ARP cache 30. As illustrated, ARP cache 30 includes the destination address, which is mapped to a corresponding MAC address of 00-00-0d-08-cd-01. Switching device 18 may obtain the MAC address from ARP cache 30 and use the MAC address to communicate UDP packet 21 to target node 20. As illustrated, the MAC address may be encoded into NIC 36 of target node 20 such that switching device 18 is able to locate target node 20 on the subnet. Once UDP packet 21 has been received by NIC 36 of target node, NIC 36 may read the magic packet encapsulated in UDP packet 21, recognize the magic packet and perform a routine to wake up target node 20.

FIG. 3 illustrates a flow diagram of an example method for waking up a node in a remote subnet. Generally, a network may be made up of multiple subnets that each include multiple nodes. At least one of the subnets may include a network manager that is used to manage the various nodes included in the network. When not active, one or more of the nodes may be operating in a sleep mode. The network manager may be used to wake up any sleeping nodes by generating a message including a magic packet and a destination address for a selected sleeping node. The message may be forwarded to a switching device based on the destination address. The switching device may include a memory that maps network addresses to hardware addresses for all nodes contained on the subnet. The switching device may compare the destination address to the network addresses. If the destination address matches one of the network address, the switching device may obtain the associated hardware address and forward the message to the selected node. Upon receiving the message, the node may recognize the magic packet such that the node executes a wake up sequence.

At step 40, a network manager, such as source node 12, may generate a subnet-directed broadcast message (e.g., UDP packet 23 as illustrated in FIG. 1) including a magic packet and a destination address. The destination address may be a subnet-directed broadcast destination address that is used to broadcast the message to all nodes on the identified subnet. For example, the subnet address of the subnet including target node 20 may be 10.98.133 and the destination address to broadcast the message to all nodes on the subnet may be 10.98.133.255. Source node 12 may additionally generate another message (e.g., UDP packet 21) including a magic packet and a destination address for a selected sleeping node, such as target node 20 at step 41. For example, the destination address may be the IP address (e.g., 10.98.133.166) for target node 20. The magic packet in UDP packets 21 and 23 may include a synchronization stream and a hardware address stream associated with target node 20.

Once the messages have been generated, source node 12 may send both messages (e.g., UDP packets 21 and 23) to switching devices 14 at step 42. Switching devices 14 may be checked to determine if the subnet-directed broadcasting functionality is enabled at step 44. If switching devices 14 are configured for subnet-directed broadcasting, switching devices 14 process the first message (e.g., UDP packet 23) using subnet-directed broadcasting in order to deliver the message to switching device 18 at step 46. Switching device 18 may receive the message and broadcast the message to all nodes on the subnet at step 47. In one embodiment, target node 20 may recognize that the magic packet included in the message is intended to wake up target node 20 based on the hardware address included in the message.

If switching devices 14 are not configured for subnet-directed broadcasting, switching devices 14 process the second message (e.g., UDP packet 21) by reading the destination address and forwarding the message to the subnet including target node 20 at step 48. When the message is received at switching device 18, the destination address may be obtained from the message and compared to a list of IP addresses included in, for example, ARP cache 30 at step 50. In one embodiment, ARP cache 30 may map the IP address of each node on the subnet associated with switching device 18 to the corresponding MAC address for the node.

If the destination address of target node 20 included in the message is not located in ARP cache 30 of switching device 18, the message cannot be sent to target node 20 because target node 20 is not located on the subnet or target node 20 has not been identified by switching device 18 at step 52. If the destination address for target node 20 included in the message is located in ARP cache 30, switching device 18 may obtain the MAC address mapped to the matching IP address at step 54. Switching device 18 then uses the MAC address associated with target node 20 to send the message to target node 20 at step 56. Irregardless of whether the message was sent to target node 20 using a subnet-directed broadcast or by searching ARP cache 30 for the destination address, NIC 36 of target node 20 may receive the message, recognize the magic packet and execute a routine to wake up target node 20 at step 58.

Using techniques of the present disclosure, the message including a magic packet that is used to remotely wake up a node may be sent to a sleeping node via any type of switching device by generating two messages including the magic packet. For example, if the subnet-directed broadcast feature of switching devices 14 is enabled, the magic packet may be communicated to target node using UDP packet 23. However, if the subnet-directed broadcast feature of switching devices 14 is not enabled, the magic packet may instead be communicated to target node using UDP packet 21. In this case, the destination address included in UDP packet 21 is compared with IP addresses stored in an ARP cache of switching device 18 in order to obtain the appropriate MAC address. The MAC address may then be used by switching device 18 to communicate the magic packet to target node 20. Use of the ARP cache to obtain the appropriate MAC address, therefore, may eliminate the need to manually configure the switching devices in a network to handle remote wake up commands between subnets.

Although the present disclosure as illustrated by the above embodiments has been described in detail, numerous variations will be apparent to one skilled in the art. For example, network 10 may include fewer or more switching devices 14 that correspond to different subnets within network 10. Additionally, any type of suitable addressing scheme that maps a network layer protocol address to a data link layer hardware address may be used to determine if target node 20 resides on a specific subnet of network 10. Finally, any type of technology used to generate a message that remotely wakes up a node may be used in place of the magic packet based technology. It should be understood that various changes, substitutions and alternations can be made herein without departing from the spirit and scope of the disclosure as illustrated by the following claims.

What is claimed is:

1. A method for delivering a magic packet to wake up a node in a remote subnet, comprising:
    receiving both a first message and a second message generated by a source node located on a first subnet at a switching device located on a second subnet remote from the first subnet;
    the first message including a wake up command for a target node on the remote second subnet and a first address associated with the remote second subnet;
    the second message including the wake up command for the target node on the remote second subnet and a second address associated with the target node on the remote second subnet;
    automatically analyzing the switching device to determine whether the switching device is configured for subnet-directed broadcasting;
    automatically selecting one of the first message and the second message to process based on the analysis of the switching device;
    if the switching device is configured for subnet-directed broadcasting, the switching device broadcasting the first message to the remote second subnet such that multiple nodes including the target node receive the wake up command; and
    if the switching device is not configured for subnet-directed broadcasting, the switching device:
        comparing the second address of the second message to a plurality of network addresses included in a memory of the switching device; and
        communicating the second message to the target node if the second address of the second message matches one of the network addresses in the memory of the switching device.

2. The method of claim 1, wherein the first and second messages each comprise a user datagram protocol (UDP) packet.

3. The method of claim 2, wherein each UDP packet further comprises a magic packet.

4. The method of claim 1, wherein the source and target nodes comprise information handling systems.

5. The method of claim 1, wherein the first and second addresses each comprise an internet protocol (IP) address.

6. The method of claim 1, wherein the memory of the switching device is operable to map the plurality of network addresses to a plurality of hardware addresses.

7. The method of claim 6, wherein communicating the second message to the target node comprises:
    identifying a hardware address mapped to the matched network address; and
    communicating the second message to the target node based on the identified hardware address.

8. The method of claim 6, wherein the hardware addresses comprise medium access control (MAC) addresses.

9. The method of claim 1, wherein the switching device comprises a router.

10. The method of claim 1, wherein the memory of the switching device comprises an address resolution protocol (ARP) cache.

11. A method for delivering a magic packet to wake up a node in a remote subnet, comprising:
    receiving both a first user datagram protocol (UDP) packet and a second UDP packet generated by a source node located on a first subnet at a switching device located on a second subnet remote from the first subnet;
    the first UDP packet including a magic packet intended for a target node on the remote second subnet and a first internet protocol (IP) address associated with the remote second subnet;
    the second UDP packet including a magic packet intended for the target node and an a second IP address associated with the target node on the remote second subnet;
    automatically analyzing the switching device to determine whether the switching device is configured for subnet-directed broadcasting;
    automatically selecting one of the first UDP message and the second UDP message to process based on the analysis of the switching device;
    if the switching device is configured for subnet-directed broadcasting, the switching device broadcasting the first UDP packet to the remote second subnet such that multiple nodes including the target node receive the UDP packet; and
    if the switching device is not configured for subnet-directed broadcasting, the switching device:
        comparing the second IP address of the second UDP packet to a plurality of network addresses included in an address resolution protocol (ARP) cache of the switching device; and
        communicating the second UDP packet to the target node if the second IP address of the second UDP packet matches one of the network addresses in the ARP cache of the switching device.

12. The method of claim 11, wherein the ARP cache is operable to map the plurality of network addresses to a plurality of hardware addresses.

13. The method of claim 12, wherein communicating the second UDP packet to the target node comprises:
    identifying the hardware address mapped to the matched network address; and
    communicating the second UDP packet to the target node based on the identified hardware address.

14. The method of claim 12, wherein the hardware addresses comprise medium access control (MAC) addresses.

15. The method of claim 11, wherein the switching device comprises a router.

16. A system for delivering a magic packet to wake up a node in a remote subnet, comprising:
    a target node located on a first subnet;
    a source node located on a second subnet remote from the first subnet, the source node operable to generate:
        a first message including a wake up command for the target node on the first subnet and a first address associated with the first subnet; and
        a second message; including a wake up command for the target node on the first subnet and a second address associated with the target node on the first subnet; and
    a switching device coupled to the target node on the first subnet, the switching device operable to:
        receive the messages;

automatically select one of the first UDP message and the second UDP message to process based on whether the switching device is configured for subnet-directed broadcasting;

if the switching device is configured for subnet-directed broadcasting, broadcast the first message to the remote first subnet such that multiple nodes including the target node receive the wake up command; and if the switching device is not configured for subnet-directed broadcasting:
   compare the address of the second message to a plurality of network addresses stored in a memory of the switching device; and
   communicate the second message to the target node if the second address of the second message matches one of the network addresses in the memory of the switching device.

17. The system of claim 16, wherein the first and second messages each comprise a user datagram protocol (UDP) packet.

18. The system of claim 16, wherein the first and second addresses each comprise an internet protocol (IP) address.

19. The system of claim 16, wherein the memory of the switching device is operable to map the plurality of network addresses to a plurality of hardware addresses.

20. The system of claim 19, wherein the switching device communicates the message to the target node by:
   identifying a hardware address mapped to the matched network address; and
   communicating the second message to the target node based on the identified hardware address.

21. The system of claim 19, wherein the hardware addresses comprise medium access control (MAC) addresses.

22. The system of claim 16, wherein the memory of the switching device comprises an address resolution protocol (ARP) cache.

\* \* \* \* \*

UNITED STATES PATENT AND TRADEMARK OFFICE
CERTIFICATE OF CORRECTION

PATENT NO. : 7,643,487 B2
APPLICATION NO. : 11/313905
DATED : January 5, 2010
INVENTOR(S) : Sethuram et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 591 days.

Signed and Sealed this

Twenty-first Day of December, 2010

David J. Kappos
*Director of the United States Patent and Trademark Office*